United States Patent
Chun et al.

(10) Patent No.: US 9,370,028 B2
(45) Date of Patent: Jun. 14, 2016

(54) METHOD AND APPARATUS FOR PERFORMING NETWORK CONNECTION IN WIRELESS COMMUNICATION SYSTEM

(71) Applicant: LG ELECTRONICS INC., Seoul (KR)

(72) Inventors: Sungduck Chun, Anyang-si (KR);
Sunghoon Jung, Anyang-si (KR);
Seungjune Yi, Anyang-si (KR);
Youngdae Lee, Anyang-si (KR);
Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 14/238,696

(22) PCT Filed: Sep. 18, 2012

(86) PCT No.: PCT/KR2012/007446
§ 371 (c)(1),
(2) Date: Feb. 12, 2014

(87) PCT Pub. No.: WO2013/042913
PCT Pub. Date: Mar. 28, 2013

(65) Prior Publication Data
US 2014/0192703 A1 Jul. 10, 2014

Related U.S. Application Data

(60) Provisional application No. 61/537,027, filed on Sep. 20, 2011, provisional application No. 61/541,101, filed on Sep. 30, 2011, provisional application No. 61/555,487, filed on Nov. 4, 2011, provisional application No. 61/556,784, filed on Nov. 7, 2011.

(51) Int. Cl.
*H04W 36/14* (2009.01)
*H04W 76/00* (2009.01)
*H04W 48/20* (2009.01)

(52) U.S. Cl.
CPC ............ *H04W 76/002* (2013.01); *H04W 48/20* (2013.01)

(58) Field of Classification Search
None
See application file for complete search history.

(56) References Cited

U.S. PATENT DOCUMENTS

| | | | | |
|---|---|---|---|---|
| 2003/0083069 | A1* | 5/2003 | Vadgama | 455/436 |
| 2008/0293419 | A1* | 11/2008 | Somasundaram et al. | 455/437 |
| 2010/0265867 | A1* | 10/2010 | Becker et al. | 370/312 |
| 2010/0291956 | A1* | 11/2010 | Iwamura et al. | 455/509 |
| 2010/0316096 | A1 | 12/2010 | Adjakple et al. | |
| 2011/0141908 | A1* | 6/2011 | Ishida et al. | 370/241 |

FOREIGN PATENT DOCUMENTS

| | | |
|---|---|---|
| EP | 2 104 389 A1 | 9/2009 |
| EP | 2 154 794 A1 | 2/2010 |
| WO | WO 2005/020618 A1 | 3/2005 |

* cited by examiner

*Primary Examiner* — Robert Wilson
*Assistant Examiner* — Ronald H Davis
(74) *Attorney, Agent, or Firm* — Birch, Stewart, Kolasch & Birch, LLP

(57) ABSTRACT

The present invention relates to a wireless communication system, and more particularly, a method and device for performing network connection are disclosed herein. The method of a user equipment for performing network connection in a wireless communication system according to an embodiment of the present invention may include the steps of receiving information on a network connection for a second type service from a first base station providing a first type service in the user equipment; based upon information on the network connection, deciding whether or not the network connection is permitted and deciding a target of the network connection; and, when the network connection is authorized, transmitting a network connection request message to the target of the network connection.

11 Claims, 8 Drawing Sheets

METHOD AND APPARATUS FOR PERFORMING NETWORK CONNECTION IN WIRELESS COMMUNICATION SYSTEM

This application is the National Phase of PCT/KR2012/007446 filed on Sep. 18, 2012, which claims priority under 35 U.S.C. 119(e) to U.S. Provisional Application Nos. 61/537,027 filed on Sep. 20, 2011, 61/541,101 filed on Sep. 30, 2011, 61/555,487 filed on Nov. 4, 2011 and 61/556,784 filed on Nov. 7, 2011, all of which are hereby expressly by reference into present application.

TECHNICAL FIELD

The following description relates to a wireless communication system and, more particularly, to a method and an apparatus for performing network connection in a wireless communication system.

BACKGROUND ART

A multimedia broadcast and multicast service (MBMS) can allow a single transmitter to simultaneously transmit the same multimedia content to a plurality of receivers using only one transmission action.

Additionally, a dedicated service (or unicast service) may be provided to a user equipment. Herein, the MBMS service and the dedicated service may be simultaneously provided over the same frequency or cell.

DISCLOSURE

Technical Problem

When the MBMS service and the dedicated service are simultaneously provided over the same frequency or cell, a network congestion may occur. When such network congestion occurs, the user equipment may not be capable of performing a network connection for receiving the dedicated service. And, accordingly, data may fail to be correctly delivered to the user equipment. Therefore, a solution for resolving such disadvantage is required to be developed.

A technical object of the present invention is to provide a method that can prevent any network congestion from occurring in a frequency or cell, over which the MBMS service and the dedicated service are simultaneously provided, and that can accurately and efficiently support and perform network connection.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

In order to resolve the above-described technical problem, a method of a user equipment for performing network connection in a wireless communication system according to an embodiment of the present invention may include the steps of receiving, at the user equipment from a first base station providing a first type service, information on a network connection for a second type service; determining whether or not the network connection is permitted and determining a target of the network connection, based upon the information on the network connection; and transmitting a network connection request message to the target of the network connection, if the network connection is permitted.

In order to resolve the above-described technical problem, a method of a base station for supporting network connection of a user equipment in a wireless communication system according to another embodiment of the present invention may include the step of transmitting, from the base station providing a first type service to the user equipment, information on a network connection for a second type service, wherein a network connection request message is transmitted from the user equipment in accordance with whether or not the network connection is permitted and a target of the network connection, which are determined based upon the information on the network connection.

In order to resolve the above-described technical problem, a user equipment performing network connection in a wireless communication system according to yet another embodiment of the present invention may include a reception module receiving a downlink signal; a transmission module transmitting an uplink signal; and a processor controlling the user equipment, the user equipment including the reception module and the transmission module. Herein, the processor may be configured to receive, from a first base station providing a first type service, information on a network connection for a second type service via the reception module; determine whether or not the network connection is permitted and determine a target of the network connection, based upon the information on the network connection; and transmit, via the transmission module, a network connection request message to the target of the network connection, if the network connection is permitted.

In order to resolve the above-described technical problem, a base station supporting network connection of a user equipment in a wireless communication system according to yet another embodiment of the present invention may include a reception module receiving an uplink signal; a transmission module transmitting the downlink signal; and a processor controlling the base station, the base station including the reception module and the transmission module. Herein, the processor may be configured to transmit, from the base station providing a first type service to the user equipment, information on a network connection for a second type service via the reception module, and wherein a network connection request message is transmitted from the user equipment in accordance with whether or not the network connection is permitted and a target of the network connection, which are determined based upon the information on the network connection.

The following contents can be commonly applied to the above-mentioned embodiments.

The information on the network connection includes at least one of information indicating whether or not a network connection to the first base station is permitted, or information indicating whether or not the network connection target is the first base station.

The target of the network connection is selected among a plurality of base stations selectable by the user equipment based upon an assumption that the first base station has the lowest priority level, or wherein the target of the network connection is selected among remaining base stations excluding the first base station from the plurality of base stations.

The information on the network connection includes information directly indicating the target of the network connection.

The information on the network connection may include a cause field value permitted for the network connection request to the first base station, and transmitting the network connection request message is performed only in the case when the cause field value of the network connection request message is identical to the cause field value permitted for the network connection request to the first base station.

The information on the network connection may include at least one of information indicating GBR (Guaranteed Bit Rate) suspend or continue, information on GBR restrictions, or information on a GBR suspend cause.

The information on the network connection includes information on a class of the user equipment permitted to establish network connection to the first base station.

The information on the network connection may include information on a wait time, during which transmission of the network request message is not permitted.

When the user equipment is not receiving the first type service from the first base station, or when the first type service has a lower priority level than the second type service for the user equipment, the first base station is determined as the target of the network connection. And, when the user equipment is receiving the first type service from the first base station, or when the first type service has a higher priority level than the second type service for the user equipment, the second base station is determined as the target of the network connection.

The information on the network connection may be provided through a paging message, higher layer signaling, or a system information block.

The target of the network connection is identified by at least one of a frequency or a cell.

The first type service is an MBMS (Multimedia Broadcast/Multicast Service), and the second type service is a dedicated service.

It is to be understood that both the foregoing general description and the following detailed description of the present invention are exemplary and explanatory and are intended to provide further explanation of the invention as claimed.

Advantageous Effects

According to the present invention a method that can prevent any network congestion from occurring in a frequency or cell, over which the MBMS service and the dedicated service are simultaneously provided, and that can accurately and efficiently support and perform network connection may be provided herein.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
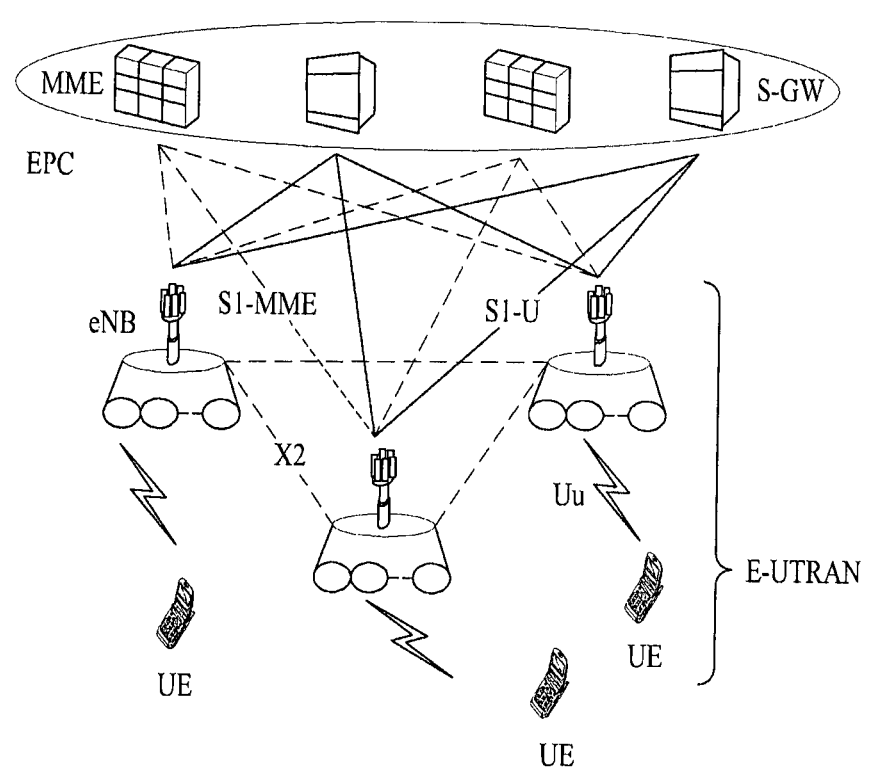
FIG. 1 is a diagram illustrating the architecture of a wireless communication system.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with the terms User Equipment (UE), Mobile Station (MS), Mobile Subscriber Station (MSS) or Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

LTE System Structure

The architecture of an LTE system, which is an example of a wireless communication system to which the present invention is applicable, is described with reference to FIG. 1. The LTE system is a mobile communication system that has evolved from a UMTS system. FIG. 1 is a conceptual diagram illustrating an LTE system. Referring to FIG. 1, the LTE system can be generally classified into an Evolved UMTS (E-UTRAN) and an Evolved Packet Core (EPC). The E-UTRAN includes a UE and an Evolved Node-B (eNB). An interface between a UE and an eNB is referred to as a Uu interface, and an interface between eNBs is referred to as an X2 interface. The EPC may include a mobility management entity (MME) and a serving gateway (S-GW). An interface between an eNB and an MME is referred to as an S1-MME interface, and an interface between an eNB and an S-GW is referred to as an S-U interface, and a generic term for the two interfaces may also be called an S1 interface.

Figure 2:
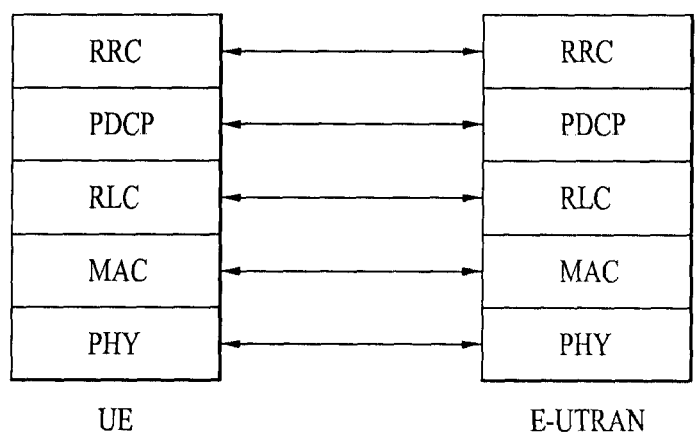
FIG. 2 is a diagram illustrating a control plane of a radio protocol.
Figure 3:
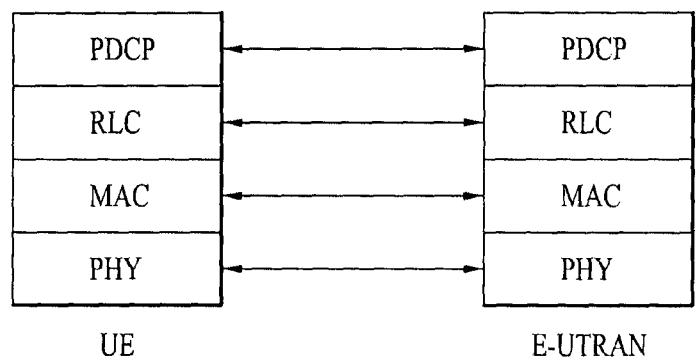
FIG. 3 is a diagram illustrating a user plane of a radio protocol.

A radio interface protocol is defined in the Uu interface which is a radio section, wherein the radio interface protocol is horizontally comprised of a physical layer, a data link layer, a network layer, and vertically classified into a user plane for user data transmission and a control plane for signaling (control signal) transfer. Such a radio interface protocol can be typically classified into L1 (first layer) including a PHY layer which is a physical layer, L2 (second layer) including MAC/RLC/PDCP layers, and L3 (third layer) including an RRC layer as illustrated in FIGS. 2 and 3, based on the three lower layers of an Open System Interconnection (OSI) reference model widely known in the field of communication systems. Those layers exist as a pair in the UE and E-UTRAN, thereby performing data transmission of the Uu interface.

Each layer of a radio protocol shown in FIGS. 2 and 3 is described. FIGS. 2 and 3 are views illustrating the control plane and user plane architecture of the radio protocol, respectively.

A physical (PHY) layer serving as the first layer (L1) transmits an information transfer service to a higher layer over a physical channel. The physical (PHY) layer is connected to a Medium Access Control (MAC) layer serving as a higher layer over a transport channel. Through the transport channel, data is transferred from the MAC layer to the physical layer or is also transferred from the physical layer to the MAC layer. In this case, the transport channel is largely classified into a dedicated transport channel and a common transport channel depending on whether or not the channel is shared. In addition, data is transferred between different PHY layers (i.e., between a PHY layer of a transmitter and a PHY layer of a receiver) over a physical channel using radio resources.

A variety of layers exist in the second layer (L2). The MAC layer maps various logical channels to various transport channels and performs logical channel multiplexing to map a plurality of logical channels to one transport channel. The MAC layer is connected to the RLC layer, which is a higher layer, through a logical channel. The logical channel is divided into a control channel for transmitting information on a control plane and a traffic channel for transmitting information on a user plane, according to the kind of transmitted information.

The radio link control (RLC) layer of the L2 layer segments and concatenates data received from a higher layer, such that it controls a data size to suit radio data transmission at a lower layer. For controlling data size, the RLC layer segments or concatenates data received from a higher layer. To support various QoS levels requisite for various radio bearers (RBs), the RLC layer provides three RLC modes, Transparent Mode (TM), Unacknowledged Mode (UM), and Acknowledged Mode (AM). Specifically, an AM RLC performs a retransmission function using an Automatic Repeat and Request (ARQ) function so as to implement reliable data transmission.

The packet data convergence protocol (PDCP) layer of the L2 layer enables efficient data transmission in IP packets such as IP version 4 (IPv4) or IP version 6 (IPv6) packets on a radio link having a relatively narrow bandwidth. For this purpose, the PDCP layer performs header compression to reduce the size of an IP packet header including relatively large and unnecessary control information. Since only necessary information is transmitted in the data header through header compression, the transmission efficiency of the radio link is increased. In addition, in the LTE system, the PDCP layer performs a security function, this security function is composed of a ciphering function (also called an encryption function) for preventing a third party from eavesdropping on data and an integrity protection function for preventing a third party from fraudulently handling data.

Referring to FIG. 2, the Radio Resource Control (RRC) layer located at the top of the third layer (L3) is defined only in the control plane and is responsible for control of logical, transport, and physical channels in association with configuration, reconfiguration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and detailed parameters and operation methods thereof are configured. The Radio Bearer (RB) is classified into a Signaling RB (SRB) and a Data RB (DRB). The SRB is used as a transmission passage of RRC messages in the control plane, and the DRB is used as a transmission passage of user data in the user plane.

In addition, a Non-Access Stratum (NAS) layer (not shown) located above the RRC layer is defined in a control plane between an MME and a UE. The NAS layer mainly performs a function for supporting UE mobility and a session management function for establishing/maintaining IP connection of a UE, and the like.

As described above, the MAC layer is connected to the RLC layer through a logical channel. The logical channel is generally classified into a control logical channel and a traffic logical channel. The control logical channels provided by the MAC layer may include a Broadcast Control Channel (BCCH), a Paging Control Channel (PCCH), a Common Control Channel (CCCH), a Dedicated Control Channel (DCCH), etc. The traffic logical channel may include a dedicated traffic channel (DTCH), etc.

In addition, the MAC layer is connected to the PHY layer through a transport channel. The downlink transport channel is associated with data transmitted from a network to a UE. The downlink transport channel may include a broadcast channel (BCH) for transmitting system information, a paging channel (PCH) for transmitting a paging message, a Downlink-Shared Channel (DL-SCH) for transmitting a user traffic or a control message, a multicast channel (MCH) for transmitting a traffic or control message of a downlink multicast or a broadcast service (i.e., MBMS), and the like. The uplink transport channel is associated with data transmitted from the UE to the network. The uplink transport channel may include a Random Access Channel (RACH) for transmitting an initial control message, a Uplink-Shared Channel (UL-SCH) for transmitting a user traffic or a control message, etc.

The mapping relationship between the logical channel and the transport channel is shown in Tables 1 and 2. Table 1 shows uplink channel mapping, and Table 2 shows downlink channel mapping.

TABLE 1

| Logical channel | Transport channel | |
|---|---|---|
| | UL-SCH | RACH |
| CCCH | X | |
| DCCH | X | |
| DTCH | X | |

TABLE 2

| Logical channel | Transport channel | | |
|---|---|---|---|
| | BCH | PCH | DL-SCH |
| BCCH | X | | X |
| PCCH | | X | |
| CCCH | | | X |
| DCCH | | | X |
| DTCH | | | X |

In case of uplink, a transport channel (UL-SCH) is mapped to a logical channel (CCCH, DCCH, or DTCH) as shown in Table 1. In case of downlink, a transport channel (BCCH) is mapped to transport channels (BCH and DL-SCH) as shown in Table 2. In addition, a logical channel (PCCH) is mapped to a transport channel (PCH), and logical channels (CCCH, DCCH, DTCH) are mapped to the transport channel (DL-SCH).

The mapping relationship between the transport channel and the physical channel is shown in Tables 3 and 4. Table 3 shows uplink channel mapping, and Table 4 shows downlink channel mapping.

TABLE 3

| TrCH | Physical Channel |
|---|---|
| UL-SCH | PUSCH |
| RACH | PRACH |

TABLE 4

| TrCH | Physical Channel |
|---|---|
| DL-SCH | PDSCH |
| BCH | PBCH |
| PCH | PDSCH |
| MCH | PMCH |

In case of uplink, a transport channel (UL-SCH) is mapped to a Physical Uplink Shared Channel (PUSCH) acting as a physical channel as shown in Table 3, and a transport channel (RACH) is mapped to a physical random access channel (PRACH) acting as a physical channel. In case of downlink, as shown in Table 4, a transport channel (DL-SCH) is mapped to a physical downlink shared channel (PDSCH) acting as a physical channel, a transport channel (BCH) is mapped to a physical broadcast channel (PBCH) acting as a physical channel, a transport channel (PCH) is mapped to a physical channel (PDSCH), and a transport channel (MCH) is mapped to a physical multicast channel (PMCH) acting as a physical channel.

A physical channel may be located in a resource region defined not only by a predetermined unit of a time domain but also by a predetermined unit of a frequency domain. The predetermined unit of the time domain may correspond to a radio frame, a subframe, a slot or a symbol. For example, one radio frame includes 10 subframes, and one subframe includes two slots, and one slot includes 7 symbols (e.g., 7 OFDM symbols) in case of a normal cyclic prefix (CP). The frequency unit of the frequency domain may correspond to a subcarrier. The resource block defined in terms of a time-frequency domain is defined not only by a plurality of symbols of the time domain but also by a plurality of subcarriers of the frequency domain. For example, one resource block may correspond to a resource region defined by 7 OFDM symbols and 12 subcarriers.

Figure 4:
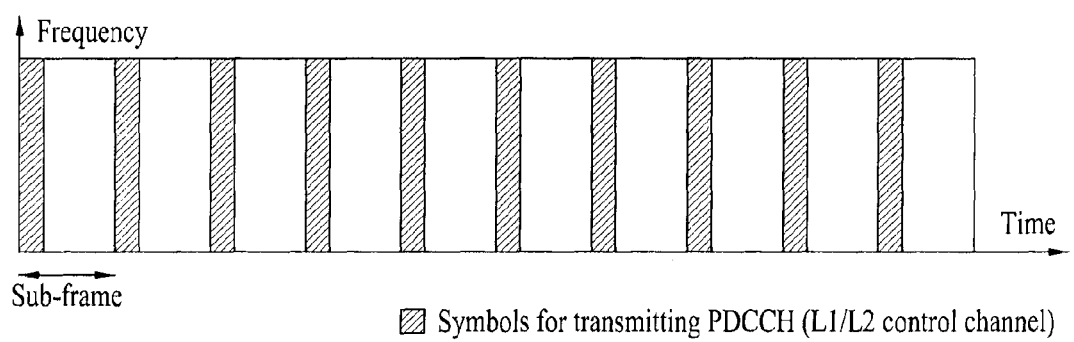
FIG. 4 exemplarily shows the position of a PDCCH in one radio frame.

In addition, a physical downlink control channel (PDCCH) may be used to transmit downlink L1/L2 control information. PDCCH may be defined in first N symbols (for example, 1≤N≤4) of a single subframe. FIG. 4 exemplarily shows the position of a PDCCH in one radio frame. In FIG. 4, each of two slots contained in one subframe is 0.5 ms long, and a Transmission Time Interval (TTI) acting as a unit time of data transmission is 1 ms long, and one radio frame may be 10 ms long. However, the frame structure shown in FIG. 4 is disclosed only for illustrative purposes, and the scope or spirit of the present invention is not limited thereto.

Carrier Aggregation (CA)

Figure 5:
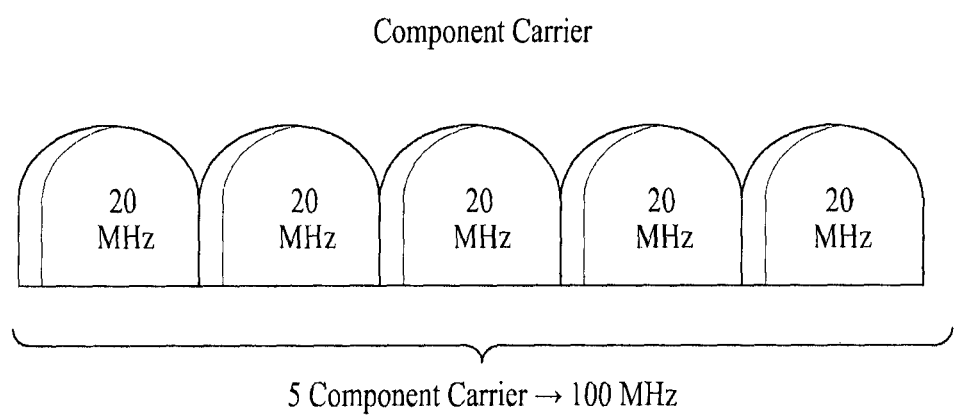
FIG. 5 is a diagram illustrating carrier aggregation (CA).

Carrier aggregation (CA) technology supporting multiple carriers will hereinafter be described with reference to FIG. 5. Carrier aggregation can support a system bandwidth up to a maximum of 100 MHz by grouping a maximum of 5 carriers (5 Component Carriers; 5 CCs) of a bandwidth unit (e.g., 1.25 MHz, 2.5 MHz, 5 MHz, 10 MHz, or 20 MHz) defined in a legacy wireless communication system (e.g., an LTE system). The bandwidth sizes of CCs used for carrier aggregation may be the same or different. Individual CCs have different frequency bands (or central frequencies). Although individual CCs used for carrier aggregation may be present on contiguous frequency bands, other CCs present in discontinuous frequency bands may also be used for carrier aggregation. In the carrier aggregation technology, bandwidth sizes of UL and DL may be symmetrically or asymmetrically allocated. In the LTE-A system, the serving cell may be composed of a single downlink CC and a single uplink CC, or may also be composed of a single downlink CC. However, the scope or spirit of the present invention is not limited thereto, and one cell for use in the evolved or other wireless communication system may be independently configured only in uplink resources.

In case of carrier aggregation technology, one RRC connection is present between a UE and an eNode B. A plurality of serving cells configured to be used by the UE is classified into PCell and SCell. PCell may correspond to a serving cell for providing not only a security input (for example, E-UTAN Cell Global Identifier (ECGI), Physical Cell Identifier (PCI), Absolute Radio-Frequency Channel Number (ARFCN)) to perform establishment or re-establishment of RRC connection, but also mobility information (for example, tracking area identity (TAI)) of the NAS layer. SCell may correspond to cells other than PCell.

In case of constructing a plurality of serving cells, SCell can be added or released by the eNode B as necessary whereas PCell can always be used. After SCell has been added by the eNode B, the SCell can be dynamically used according to an activation or deactivation state.

Multimedia Broadcast and Multicast Service (MBMS)

MBMS is a point-to-multipoint (p-t-m) transmission method which enables a plurality of UEs within the corresponding cell to simultaneously receive the same packet using only one transmission action of the eNode B within one cell. The LTE system based on the OFDMA transmission scheme has defined a multi-cell transmission scheme acting as a broadcast transmission scheme in which a plurality of eNode Bs simultaneously transmits the same packet.

The LTE system defines an MBSFN (MBMS Single Frequency Network) synchronization area (or MBSFN synchronous region) in which synchronization transmission is available for the multi-cell transmission service. Synchronization transmission of cells contained in the MBSFN synchronous region is possible, and inter-cell interference and diversity gain can be obtained through synchronization transmission. One cell belongs to one MBSFN synchronous region. A plurality of MBSFN regions (for example, 256 MBSFN regions) may be present in the MBSFN synchronous region. The same radio resource region is allocated for MBSFN to cells contained in the MBSFN region, and the corresponding cells have broadcast channel information. A plurality of MCHs (for example, a maximum of 16 MCHs) transmitted using the same coding method may be present in one MBSFN region. A service for providing a plurality of broadcast contents (for example, a maximum of 30 broadcast contents) can be provided through one MCH.

Figure 6:
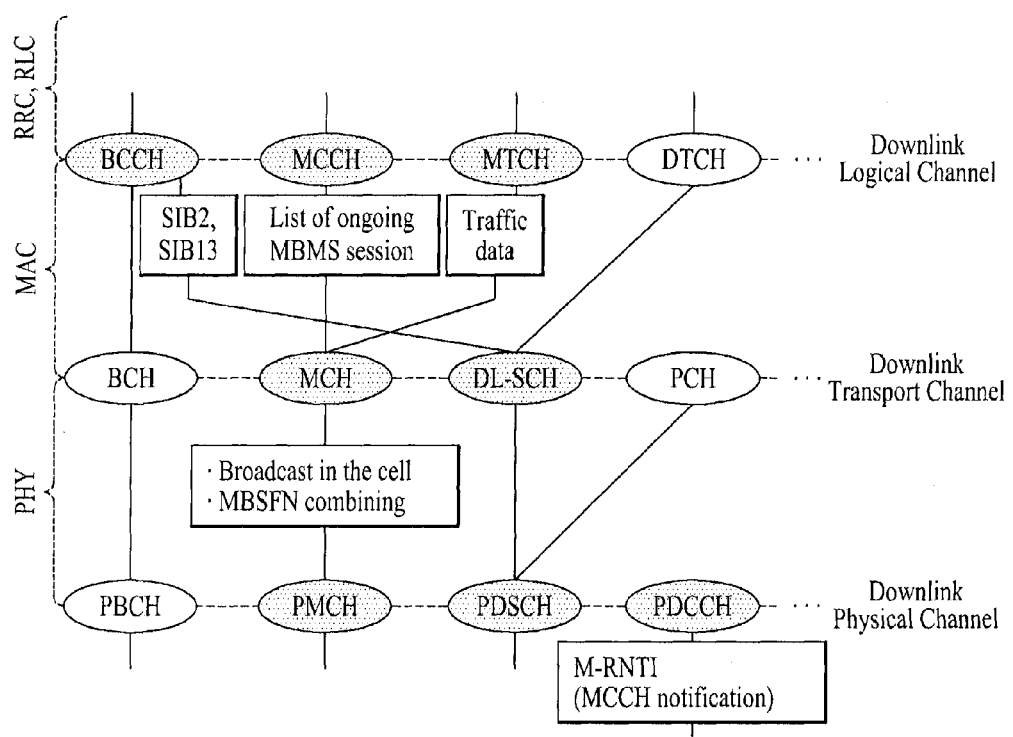
FIG. 6 is a diagram illustrating an MBMS channel structure.

FIG. 6 is a diagram illustrating an MBMS channel structure.

A logical channel (BCCH) can provide system information through various types of system information blocks (SIBs). In association with MBMS, SIB Type 2 (SIB2) may include configuration information regarding subframe allocated for MBSFN. In addition, SIB13 may include information (for example, MCCH position information) necessary for obtaining MBMS control information. While a master information block (MIB) from among information transferred through a logical channel (BCCH) is provided to the UE over a transport channel (BCG) and a physical channel (PBCH), SIB (for example, SIB2 or SIB13) can be provided to the UE over a transport channel (DL-SCH) and a physical channel (PDSCH).

MCCH is a logical channel for transmitting MBMS control information (for example, MBSFN area information, information regarding current ongoing MBMS sessions, etc.) and the like. MTCH is a logical channel for transmitting MBMS user traffic data. MBMS control information may correspond to an MBMS-related RRC message. Each MBSFN region for transmitting the same MBMS information/traffic includes one MCCH channel. If one cell provides a plurality of MBSFN regions, the UE may also receive a plurality of MCCHs.

A logical channel (MCCH) and/or another logical channel (MTCH) may be mapped to a transport channel (MCH). MCH is based on the point-to-multipoint (p-t-m) transmission scheme, is broadcast within a cell, and is used as a transport channel of the MBSFN subframe. Allocation of a subframe used for MBSFN may be semi-statically achieved in MBMS Coordination Entity (MCE). A transport channel (MCH) may be mapped to a physical channel (PMCH).

Assuming that the new MBMS is added, MBMS-Radio Network Temporary Identifier (M-RNTI) may be used by PDCCH so as to inform an idle-state UE of new MBMS addition. For example, if an MBMS-related RRC message is changed in a specific MCCH channel, an indicator indicating a specific MCCH and an M-RNTI can be transmitted through a PDCCH. The UE supporting the MBMS receives an M-RNTI indicator and an MCCH indicator through the PDCCH, such that it can recognize the change of MBMS-related RRC message in a specific MCCH, and can receive the specific MCCH. The RRC message of MCCH can be changed every change period, and can repeatedly broadcast every repetition period (RP).

Table 5 shows detailed description of MBMS-related channels from among channels shown in FIG. 6.

TABLE 5

| Logical Channel | BCCH | SIB2: MCH subframe allocation information |
|---|---|---|
| | | SIB13: MCCH position information, etc. |
| | MTCH | Data traffic information is transmitted to UE. |
| | MCCH | MBSFN region information is transmitted every MCCH RP. MTCH channel information (information of activated service) is transmitted. |
| Transport Channel | MCH | MCCH and MTCH transmission. P-t-M transmission. Cell broadcast |
| Physical Channel | PMCH | MCH is transmitted in MBSFN subframe |
| | PDCCH | Service start indication (M-RNTI) |

In addition, the UE may receive a dedicated service during the MBMS reception. For example, a certain user can view a TV program using his or her smartphone, and at the same time can chat with other users through instant messaging (IM) such as MSN or Skype using the smartphone. In this case, TV viewing may correspond to an MBMS that enables a plurality of UEs can simultaneously receive data, and the IM service may correspond to a dedicated service separately provided to each UE (here, the MBMS may correspond to a multicast/ broadcast service, and the dedicated service may correspond to a unicast service). The MBMS is provided through an MTCH, and the dedicated service is provided through a dedicated bearer such as DCCH or DTCH. In this case, the bearer may indicate a logical/virtual connection for providing a service having a predetermined quality (QoS), and the dedicated bearer may indicate a bearer for a dedicated service for each UE.

It is assumed that a certain eNode B provides the MBMS and the dedicated service. It is also assumed that the eNode B can simultaneously use a plurality of frequencies within one region. Here, the frequency may be a frequency (i.e., MBMS frequency) corresponding to a unit used for MBMS. In order to efficiently utilize radio resources, the eNode B can provide the MBMS at only one frequency selected from among a plurality of frequencies, and can provide each UE with a dedicated bearer at all frequencies. That is, both the MBMS and the dedicated service can be provided at a frequency selected for MBMS.

If the UE having received the service using the dedicated bearer at a frequency not providing the MBMS desires to receive the MBMS, the UE needs to be handed over to a frequency providing the MBMS. For this purpose, the UE can transmit an MBMS interest indication message to the eNode B. In other words, if the UE desires to receive the MBMS, the UE transmits the MBMS interest indication message to the eNode B. If the eNode B supporting the MBMS receives the MBMS interest indication message, this means that the UE desires to receive the MBMS, so that the UE can be shifted to or handed over to a frequency providing the MBMS.

In this case, the MBMS interest indication message indicates that the UE desires to receive the MBMS. In addition, the MBMS interest indication message may include information regarding a target frequency desired by the UE. That is, the MBMS interest indication message is used to indicate that the UE is receiving the MBMS or the UE is going to receive (or is interested to receive) the MBMS. The MBMS interest indication message may further include MBMS frequency information used for transmission of the MBMS that is currently received by the UE or is going to be received by the UE.

Paging

Paging operations may be used by the network for transmitting paging information to a user equipment, which is in an RRC_IDLE state. Herein, paging information may be provided to a higher layer, and an operation of initiating an RRC connection establishment operation (e.g., receiving an incoming call, and so on). Also, the paging operation may also be used and performed for notifying a user equipment, which is in an RRC_IDLE state or an RRC_CONNECTED state, of a change in the system information and/or an ETWS (Earthquake and Tsunami Warning System) notification.

When receiving a paging message, the user equipment may perform a discontinuous reception (DRX) for the purpose of reducing power consumption. In order to do so, the network is required to be capable of configuring multiple Paging Occasions for each time period, and a specific user equipment is required to be capable of attempting to receive and acquiring a paging message only during a specific paging occasion. Thus, the user equipment may not receive a paging channel during the remaining time periods excluding the specific paging occasion. Accordingly, the power consumption level of the user equipment may be reduced. Herein, one paging occasion correspond to one TTI.

More specifically, the user equipment receives a downlink channel for each paging occasion. In other words, the user equipment may be awaken (or turned back on) during a subframe respective to the corresponding paging occasion, so as to receive a PDDCH. At this point, when the user equipment receives a P-RNTI (Paging-RNTI) corresponding to the paging operation through the PDCCH, the user equipment may receive a paging message through a radio resource, which is indicated by the PDCCH. Referring to FIG. 6, a paging channel (PCH), which corresponds to a downlink transmission channel being used for transmitting a paging message, may be mapped to a PDSCH, which corresponds to a downlink physical channel. And, the user equipment may then receive the paging message through the PDSCH, which is indicated by the PDCCH. After receiving the paging message, the user equipment may verify whether or not the paging message includes an identifier, which is assigned to the user equipment (e.g., an identifier such as an IMSI (International Mobile Subscriber Identity) being assigned to the corresponding user equipment). Then, when the user equipment verifies that a matching identifier exists, the corresponding user equipment may notify a higher layer that a paging message has been received. Accordingly, the PPC connection establishment procedure may be initiated.

Method for Resolving Congestion Caused by the MBMS and Dedicated Services

When the MBMS service is provided over a frequency or cell, which is different from that of a dedicated service (or unicast service), no significant problem occurs. However, the MBMS service may be provided along with the dedicated service over a frequency or cell having a dedicated barrier, which is designated for general users, established therein. When the MBMS service is simultaneously provided over the same frequency or cell along with a dedicated service, the problem of network congestion may occur. For example, when a plurality of user equipments exists over a frequency or cell through which an MBMS service is being provided, and when the plurality of user equipment cause heavy traffic due to the dedicated barriers assigned to each of the corresponding user equipments, a lack of radio resource may occur in the corresponding frequency or cell. If a radio resource is assigned to the MBMS service with higher priority over other services, the service quality of the MBMS service, which is being provided to the plurality of user equipments existing over the corresponding frequency or cell through the dedicated barriers, may be degraded, or the data communication may not be correctly performed.

Additionally, as a large number of user equipment (e.g., smart phones) exists within a wireless communication system, and as diverse applications are being used simultaneously by each of the user equipments, the size of irregular and frequent data traffic, which is being transmitted to each of the user equipments through the internet, becomes larger. When data that are to be transmitted to a user equipment exist, the base station may notify paging information to the corresponding user equipment through a paging channel. And, after receiving the paging information, the user equipment may initiate RRC connection establishment with the base station. When the above-described paging message reception and RRS connection establishment operations, which correspond to the dedicated barrier (or unicast service), are performed in the plurality of user equipments existing over the frequency or cell through which the MBMS service is being provided, a larger amount of weight load occurs within the corresponding frequency or cell, and the lack of radio resource may become more critical. Furthermore, when considering a process performed by the user equipment for reattempting to perform RRC connection establishment, due to the user equipment's failure to perform RRC connection establishment during a previous attempt, which was caused by network congestion, the likelihood of a serial failure to perform the RRS connection establishment in other user equipments may increase.

The present invention will describe a method that can resolve the problem of congestion occurring within a frequency or cell, through which MBMS service and dedicated service (or unicast service) are simultaneously provided. Additionally, the present invention will also describe methods for accurately and efficiently delivering downlink data with respect to a user equipment that exists within a frequency or cell, through which the MBMS is being provided.

Embodiment 1

This embodiment of the present invention relates to a method for providing information on a target with which a user equipment (UE) will attempt to establish connection.

According to this embodiment of the present invention, a base station may provide a user equipment with redirection information. Herein, redirection information refers to information indicating through which frequency or cell the user equipment should be attempting to establish a network connection. For example, information indicating whether or not the user equipment should attempt to establish connection within a cell or frequency in which the corresponding user equipment is located, or indicating whether or not the user equipment should attempt to establish connection with another cell or frequency, may be provided through the redirection information. Additionally, a connection refers to a state when the user equipment attempts to perform an RRC connection establishment procedure, so as to establish an RRC connection with the base station, thereby going into an RRC_CONNECTED state. In the description of the present invention, the redirection information being applied in a frequency or cell through which the MBMS is provided will hereinafter be referred to as MBMS redirection information.

Additionally, for clarity, this embodiment of the present invention will be described under the assumption that downlink data (i.e., downlink data for a dedicated service), which are to be transmitted to the user equipment operating over a frequency or cell through which the MBMS service is being provided, are being generated. However, the scope of the present invention will not be limited only to this. And, the scope of the present invention will include that the MBMS redirection information are provided to the user equipment in accordance with diverse situations or methods.

For example, when downlink data for a user equipment, which remains in a frequency or cell through which the MBMS service is being provided are received from another network entity, the base station may deliver a paging message, which includes the MBMS redirection information, to the user equipment. The MBMS redirection information may include information indicating whether or not a connection to the network should be attempted from a frequency or cell receiving the paging message, or indicating whether or not a connection to the network should be attempted from a frequency or cell other than the frequency or cell receiving the paging message. More specifically, a user equipment that has received the paging message according to the present invention may decide the target with which the user equipment should attempt to establish connection in accordance with the information indicated by the MBMS redirection information.

If the MBMS redirection information indicates that the user equipment should attempt to establish network connection from a frequency or cell other than the frequency or cell receiving the paging message, the user equipment may perform a cell selection or cell reselection process. Herein, the cell selection process may be performed by performing procedures, such as radio link measurement, broadcast channel detection, synchronization, and so on. And, the cell reselection process may be performed when a cell that is more adequate to the user equipment cell is searched and found. Accordingly, the user equipment may select a frequency or cell other than the frequency or cell receiving the paging message, so as to attempt to establish network connection.

Moreover, the frequency or cell to which the user equipment is to attempt to establish connection may be decided in accordance with the user equipment status and/or a predetermined priority level. As described above, this may be applied as an additional determination basis for deciding a connection target, in case MBMS redirection information is included in the paging message. Alternatively, in case the MBMS redirection information is not included in the paging message, this may be applied as a determination basis for deciding a connection target.

For example, in case the user equipment has received a paging message, while the corresponding user equipment is in a state when the MBMS is currently not received by the user equipment, the user equipment may select a cell other than the cell through which the paging message is being received, so as to attempt to establish connection. Herein, another cell may refer to a cell existing over a frequency other than the frequency of the cell, which has received the paging message, or may refer to another cell existing over the same frequency as the cell, which has received the paging message. For example, when a plurality of cells is each defined for a different geographical region (or coverage) over the same frequency, and when the current position of the user equipment simultaneously exists within the coverage of the plurality of cells, or when the user equipment is repositioned (or relocated), another cell existing within the same frequency may be selected.

Additionally, the frequency or cell to which the user equipment is to attempt to establish connection may be decided based upon a predetermined priority level. For example, when the user equipment prefers or prioritizes the dedicated service (or unicast service) over the MBMS, the user equipment may select a frequency or cell other than the frequency or cell, which has received the paging message, so as to attempt to establish connection. Alternatively, when the user equipment prefers the MBMS over the dedicated service (or unicast service), the user equipment may select the frequency or cell that has received the paging message, so as to attempt to establish connection. The process of deciding the connection attempt target in accordance with the above-described priority level may be applied to a case when the user equipment has received the paging message, while the user equipment has already received the MBMS. Or, such process may also be applied independently to whether or not the user equipment has currently received the MBMS.

The operation process of a user equipment, which has received the paging message, selecting a frequency or cell other than the frequency or cell through which the paging message is received may be performed as described below. For example, the user equipment may assume that a RAT (Radio Access Technology) frequency, to which the current cell belongs, has the lowest cell selection/reselection priority level. Alternatively, the user equipment may exclude the RAT frequency, to which the current cell belongs, from the cell reselection candidate.

Additionally, in the above-described examples, when the user equipment decides to attempt to establish connection with a frequency or cell other than the frequency or cell, which has received the paging message, the user equipment may also perform additional evaluation on other frequency or cell candidates. For example, the additional evaluation may include selecting a corresponding cell as the cell to which the user equipment is to attempt to establish connection, only when the corresponding cell satisfies minimum standard qualifications. Also, as a result of the additional evaluation, when it is determined that no cell satisfying the minimum standard qualifications exist, the user equipment may attempt to perform connection establishment with the cell, which has received the paging. For example, the predetermined minimum standard qualification may be defined based upon a level of network congestion or radio link quality, and so on.

Furthermore, the MBMS redirection information, which is provided by the base station to the user equipment, may also include information (e.g., cell ID) explicitly or directly indicating the frequency or cell to which the user equipment should attempt to perform connection establishment. In this case, the user equipment may attempt to perform connection establishment with a frequency or cell, which is indicated in the MBMS redirection information.

The user equipment's attempt to establish connection according to the present invention will hereinafter be described in detail. For example, when the user equipment attempts to establish connection with a frequency or cell other than the frequency or cell, which has received the paging message, as described above, the RRC connection establishment process may be performed. During the RRC connection establishment process, the user equipment may transmit an RRC connection request message. The user equipment may transmit an RRC connection request message. The RRC connection request may include an identification information field (e.g., ue_Identity field), a cause field (e.g., establishmentCause field), and so on, and the cause field may have values of emergency, HighPriorityAccess, mt (mobile terminating)-access, mo (mobile originating)-Signalling), mo-Data, and so on. For example, when transmitting the RRC connection request message according to the paging operation, the user equipment may set up the cause information field as an mo-access.

According to this embodiment, whether or not a network connection can be established from a frequency or cell, through which the MBMS is being provided, may be decided based upon the value of the cause field of the RRC connection request. The base station may determine a cause field value, which is acceptable to a specific frequency or cell, and may notify the user equipment of such cause field value. The cause field value, which is acceptable to a specific frequency or cell, may be provided to the user equipment through a higher layer signaling (e.g., RRC signaling) or a system information block (SIB). Accordingly, the user equipment may only perform connection corresponding to the acceptable cause field value. For example, the user equipment may compare a cause field value of the RRC connection request for the connection, which the corresponding user equipment is about to attempt, with a cause field value, which is acceptable to a specific frequency or cell, the acceptable cause field value being provided from the base station. Based upon the compared result, when it is determined that both cause field values are the same, the user equipment may attempt to establish connection with the corresponding cell. Alternatively, based upon the compared result, when it is determined that both cause field values are different from one another, the user equipment may attempt to establish connection with another frequency or cell, or may not attempt to establish any connection.

Furthermore, information on a target which the user equipment intends to attempt to establish connection with (i.e., MBMS redirection information), will not be limited only to being delivered through the paging message, and such information may, therefore, be provided to the user equipment from the base station through system information. Accordingly, the above-described operation of the present invention may not only be applied to the user equipments, which have received the paging message, but also to all user equipments attempting to establish network connection for any reason (or cause). In case the MBMS redirection information, which is being provided through the SIB of a specific cell, indicates (or designates) a connection with a cell (or frequency) other than the corresponding cell, the user equipment may perform cell reselection on another cell and may attempt to establish network connection accordingly.

Embodiment 2

This embodiment of the present invention relates to a method of preventing or resolving the occurrence of congestion. For example, information on a congestion situation may correspond to information directly notifying that congestion has occurred in a cell to which the MBMS is being provided, or that congestion has been resolved. Additionally, whether or not congestion has occurred may be indirectly notified through information on whether or not radio resource can be provided, information on whether or not a network connection is permitted, and so on. Accordingly, when the user equipment recognizes that congestion has occurred in the network, the user equipment may not perform network connection from the corresponding frequency or cell, thereby resolving the congestion situation.

More specifically, for example, the base station may provide the user equipment with information on whether or not a GBR (Guaranteed Bit Rate) service can be provided. The GBR service refers to a service that is guaranteed to be provided with a service quality (i.e., QoS (Quality of Service)), which a user experiences, or at a bit rate that exceeds a predetermined QoS or bit rate level, or refers to a service having a GBR value other than 0. When congestion occurs, it may be difficult to provide such GBR service. Information on whether or not a GBR service can be provided may indirectly indicate the congestion situation within the network. For example, the base station may provide the user equipment with information indicating GBR suspend/continue. When the user equipment receive a GBR suspend direction from the base station, the usage of a barrier or service corresponding to the GBR may be temporarily suspended. And, when the user equipment receives a GBR continue direction from the base station, the usage of a barrier or service corresponding to the GBR may be continued. Furthermore, based upon the information one whether or not a GBR service can be provided, the user equipment may be capable of deciding whether or not to attempt network connection from the corresponding frequency or cell.

Additionally, the base station may transmit information on limitation (or restriction) of the GBR service to the user equipment. If the user equipment receives information indicating that the GBR service is restricted (or limited), the corresponding user equipment may not perform the RRC connection request process for setting up a radio barrier for the GBR service, or the corresponding user equipment may not perform radio barrier set-up for the GBR service. However, in case the GBR service is restricted (or limited), a procedure for setting up a radio barrier for another purpose (or usage) may be permitted.

Moreover, when the RRC connection has been released (or cancelled), or when the GBR barrier has been released (or cancelled), the base station may notify the user equipment of whether or not the RRC connection or GBR release (or cancellation) is caused by network congestion or whether or not the RRC connection or GBR release (or cancellation) is caused by a GBR barrier. Also, the base station may instruct (or direct) the user equipment not to perform radio barrier set-up for the GBR service or not to perform RRC connection for the GBR service. The base station may deliver information indicating RRC connection release (or cancellation) or GBR service/barrier release (or cancellation) to an entity, such as an MME, S-GW, and so on, of a core network. And, information indicating the cause of such release (or cancellation) may also be delivered to the user equipment along with the corresponding information. The base station may also additionally provide the user equipment and/or core network entity within information on a time period during which the GBR barrier set up or RRC connection is not permitted (or allowed).

Also, the base station may provide the user equipment with MBMS service dedicated ACB (Access Class Barring) information. The ACB may be applied for an overload control, and whether or not a network connection is permitted may be indicated to a user equipment, which belongs to a specific class, through the ACB. According to the MBMS-dedicated ACB method of the present invention, when a user equipment that wishes to receive an MBMS service attempts to establish a network connection (i.e., when the corresponding user equipment attempts to perform RRC connection), the user equipment may refer to an MBMS-dedicated ACB value, which is provided by the base station, so as to determined whether or not the corresponding user equipment can attempt to establish network connection. Then, the user equipment may perform network connection only when the corresponding user equipment is permitted.

Additionally, whether or not a network connection is permitted may be decided based upon a priority level on the MBMS service of the user equipment. For example, for a user equipment prioritizing the MBMS service over another service (e.g., a dedicated service or a unicast service), the base station may direct the corresponding user equipment not to attempt to establish network connection from the frequency or cell to which the user equipment is connected. Accordingly, a user equipment that wishes to receive an MBMS (e.g., when an MBMS interest indication is transmitted), or a user equipment that prioritizes the MBMS over other services may not attempt to establish network connection and may attempt to establish connection only in other cases.

Moreover, the base station may inform the user equipment of whether or not a connection attempt is permitted to be performed on the corresponding base station. For example, the user equipment may correspond to a user equipment that receives the MBMS service. In this case, when it is indicated to the user equipment, which receives the MBMS service, that a connection with a specific base station can be attempted, and if the user equipment requires a network connection, the corresponding user equipment may initiate the RRC connection establishment procedure on the specific base station. Also, when a user equipment, which is currently receiving an MBMS service, seeks to attempt a network connection, the base station may notify the corresponding user equipment of information on whether or not a network connection is to be attempted from a frequency or cell, in which the current user equipment is located, or information on whether or not network connection is to be attempted from another frequency or cell. Accordingly, when the base station directs the user equipment, which is currently receiving the MBMS service, not to attempt any connection with the corresponding base station, yet when the user equipment seeks to attempt network connection, the corresponding user equipment may initiate the RRC connection establishment procedure by shifting to another frequency or cell.

Furthermore, when the user equipment is not receiving the MBMS service, or when the user equipment prioritizes another service (e.g., dedicated service or unicast service) over the MBMS service, the base station may notify the user equipment of information on whether or not a network connection may be attempted from a frequency or cell, in which the corresponding user equipment is currently located, (or whether or not network connection may be attempted from another frequency or cell).

Embodiment 3

This embodiment of the present invention relates to a method for providing MBMS wait time information. The MBMS wait time information may be provided from the base station to the user equipment, and the MBMS wait time information may include information on a time period during which the connection request of the user equipment is not permitted (or allowed). Also, the MBMS wait time information may be UE-specifically or UE group-specifically defined.

For example, when congestion has occurred in a cell to which an MBMS service is being provided, and when the connection of the specific user equipment should be released, the base station may transmit a message ordering (or commanding) a connection release to the specific user equipment. And, the MBMS wait time information may also be transmitted along with the corresponding message. Also, as described in the example presented above, when a radio resource cannot be provided to the user equipment due to network congestion, the base station may notify the user equipment that the GBR barrier set up or RRC connection is not permitted, and the base station may additionally provide the MBMS wait time information (i.e., information on the time period during which the GBR barrier set up or RRC connection is not permitted) along with the corresponding notification.

After receiving the MBMS wait time information, the user equipment may operate, so that an attempt to establish network connection during the indicated wait time can be avoided. Herein, when the user equipment, which has received the MBMS wait time information, is continuously receiving the MBMS service, or when the corresponding user equipment prioritized the MBMS service over another service (e.g., a dedicated service or unicast service), the user equipment may operate, so that an attempt to establish network connection during the indicated wait time can be avoided. More specifically, in case of a user equipment that is not receiving the MBMS service, or in case of a user that prioritizes another service over the MBMS service, the network connection request may not be restricted (or limited) during the MBMS wait time. Furthermore, the user equipment, which has received the MBMS wait time information, may operate so that the user equipment can avoid attempting to establish any network connection while remaining in the frequency or cell, during which the user equipment has received the MBMS wait time information. More specifically, when a user equipment shifts from the frequency or cell, during which the user equipment has received the MBMS wait time information, to another frequency or cell, the MBMS wait time information may not restrict the corresponding user equipment's attempt to establish network connection over the other frequency or cell.

In the above-described embodiments of the present invention, exemplary methods for resolving network congestion situations in a frequency or cell being provided with an MBMS service have been described. However, the same principles described in the present invention may also be applied as a method for preventing or relieving network congestion, by providing at least one or more of information on a network connection target from a network providing a specific service, information on whether or not a network connection is permitted, and information on a wait time for a network connection.

Figure 7:
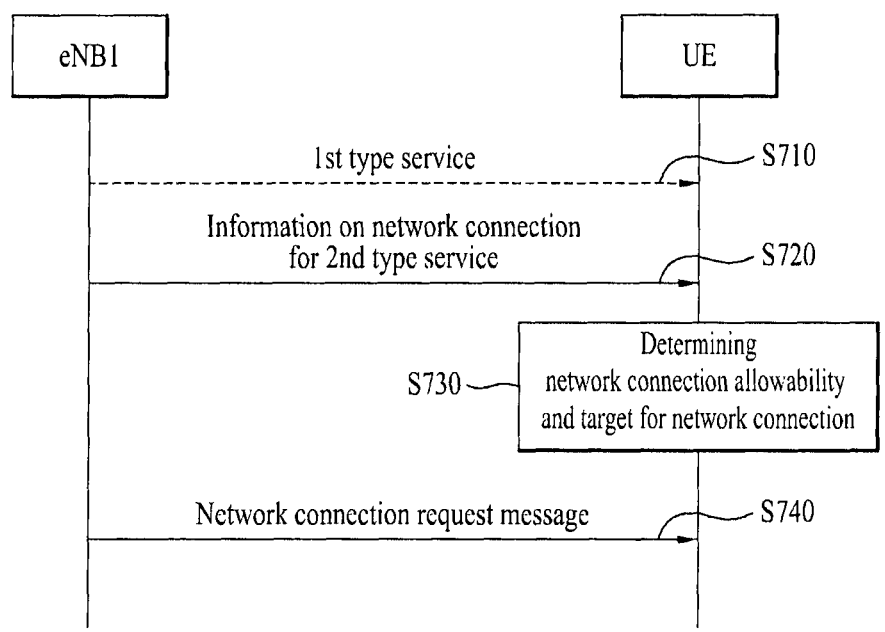
FIG. 7 is a diagram illustrating a method for performing and supporting a network connection according to an embodiment of the present invention.

FIG. 7 is a diagram illustrating a method for performing and supporting a network connection according to an embodiment of the present invention.

In step S710, a first base station (eNB1) may provide a first type service (e.g., MBMS). Herein, it will be assumed that a user equipment is located in a frequency or cell corresponding to the first base station. In step S710, the transmission of the first type service is marked in a dotted line because the user equipment (UE) may correspond to a user equipment that is receiving the first type service from the first base station, or because the user equipment may correspond to a user equipment that does not receive the first type service. Accordingly, the operation of the user equipment that is performed during the network connection establishment, which will be described later on, may be decided herein.

In step S720, the first base station may provide information on a network connection for a second type service (e.g., dedicated service). The information on the network connection may be transmitted to the user equipment through a paging message, system information, or higher layer signaling, and so on. The information on the network connection may include information on whether or not a network connection for the second type service is permitted to be established with the first base station, information indicating whether or not a target of the network connection for the second type service corresponds to a frequency or cell corresponding to the first base station or to a frequency or cell corresponding to another base station (e.g., second base station), and so on. Also, the diverse types of information, which are described above in embodiment 1 to embodiment 3 of the present invention, may be included in the information on the network connection.

In step S730, based upon the information on the network connection, which is received in step S720, the user equipment may decide whether or not the network connection is permitted, and may also decide a network connection target. For example, when the user equipment seeks to perform network connection, and when a network connection to the first base station is not permitted, the user equipment may decide another target to which the network connection can be established. Also, depending upon whether or not the user equipment is currently receiving the first type service, whether or not to perform network connection or a network connection target may be decided. Also, even when the user equipment does not receive the first type service, depending upon whether or not the corresponding user equipment prioritizes the first type service over the second type service, whether or not to perform network connection or a network connection target may be decided.

In step S730, when the network connection is permitted, and when the first base station is decided as the network connection target, as described in step S740, the user equipment may transmit a network connection request message respective to the frequency or cell corresponding to the first base station. Accordingly, the subsequent network connection establishment procedure (not shown) may be performed. Meanwhile, in step S730, when the network connection is permitted, and when a base station (e.g., second base station) other than the first base station is decided as the network connection target, the user equipment may transmit a network connection request message respective to a frequency or cell corresponding to the other base station and may, then, perform the network connection establishment procedure. Furthermore, in step S730, when the network connection is currently not permitted, the user equipment may not transmit a network connection request message. Alternatively, the user equipment may perform a network connection request after waiting for a predetermined time period.

In the operation of performing and/or supporting the above-described network connection according to the present invention, the details that are described above according to the diverse embodiments of the present invention may be independently applied or 2 or more embodiments may also be applied in combination. Herein, for clarity, description on the identical parts (or features) will be omitted.

Figure 8:
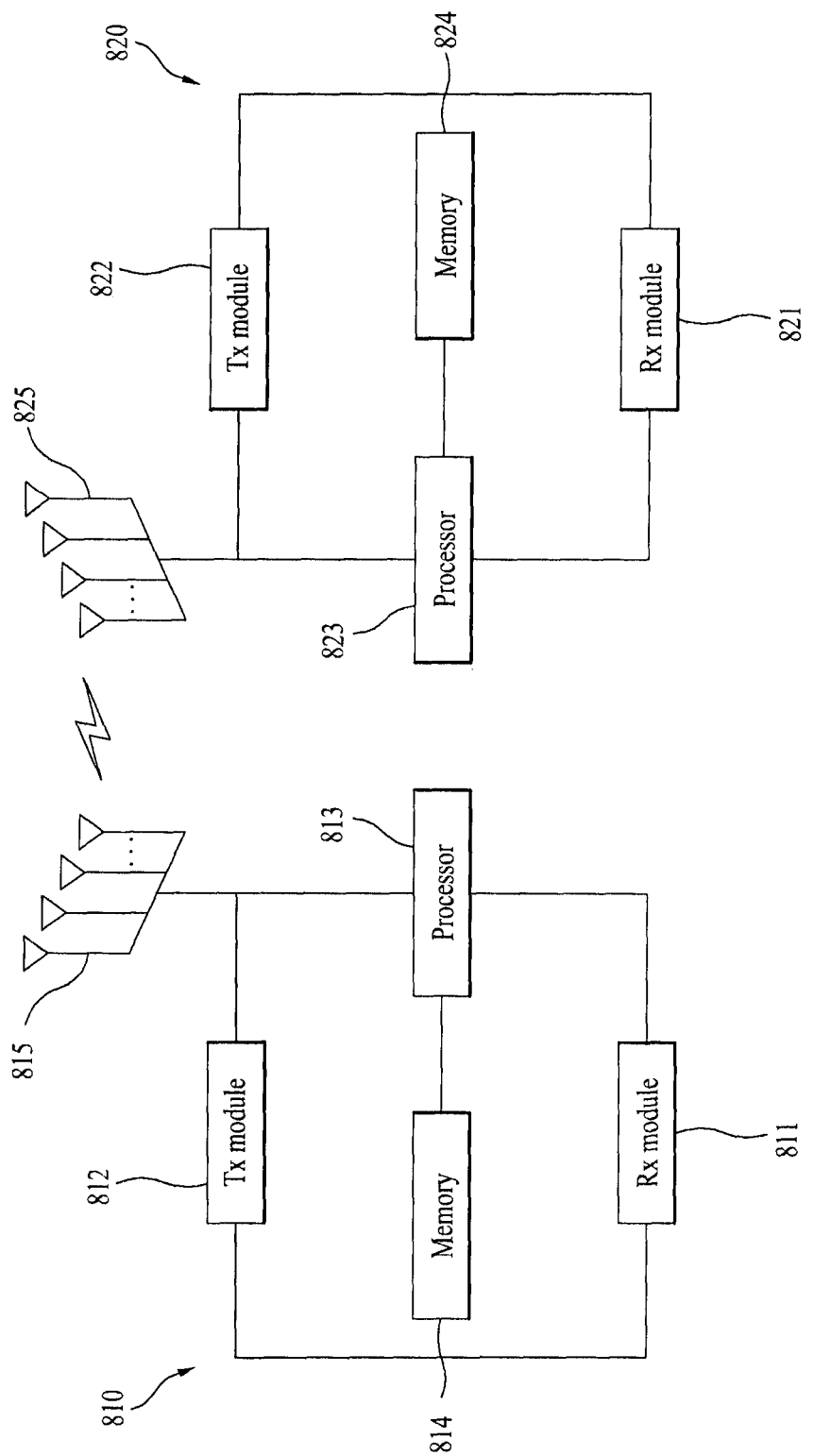
FIG. 8 is a diagram illustrating a base station device and a user equipment device according to a preferred embodiment of the present invention.

FIG. 8 is a diagram illustrating a base station device (810) and a user equipment device (820) according to a preferred embodiment of the present invention.

Referring to FIG. 8, the base station device (810) according to the present invention may include a reception module (811), a transmission module (812), a processor (813), a memory (814), and a plurality of antennae (815). Herein, the plurality of antennae (815) indicates a base station device supporting MIMO transmission/reception. The reception module (811) may receive diverse signals, data, and information from the user equipment via uplink. And, the transmission module (812) may transmit diverse signals, data, and information to the user equipment via downlink. The processor (813) may control the overall operations of the base station device (810).

The base station device (810) according to the embodiment of the present invention may be configured to support a network connection of the user equipment (820). The processor (813) of the base station device (810) may be configured to transmit information on a network connection for a second type service (e.g., dedicated service) from the base station (810), which provides a first type service (e.g., MBMS), to the user equipment (820) through the transmission module (812). The base station device (810) may receive a network connection request message from the user equipment (820) through the reception module (811). Herein, the network connection request message may be transmitted from the user equipment (820) in accordance with whether or not a network connection is permitted, which is decided based upon information on the network connection, and in accordance with the network connection target.

Additionally, the processor (813) of the base station device (810) may also perform functions of processing calculation (or operation) of information received by the base station device (810), information that is to be transmitted to the outside, and so on. And, the processor (813) of the base station device (810) may also be replaced by an element, such as a buffer (not shown).

Referring to FIG. 8, the user equipment device (820) according to the present invention may include a reception module (821), a transmission module (822), a processor (823), a memory (824), and a plurality of antennae (825). Herein, the plurality of antennae (825) indicates a user equipment device supporting MIMO transmission/reception. The reception module (821) may receive diverse signals, data, and information from the base station via downlink. And, the transmission module (822) may transmit diverse signals, data, and information to the base station via uplink. The processor (823) may control the overall operations of the user equipment device (820).

The user equipment device (820) according to the embodiment of the present invention may be configured to support a network connection. The processor (823) of the user equipment device (820) may be configured to receive information on a network connection for a second type service (e.g., dedicated service) from the base station (810), which provides a first type service (e.g., MBMS), through the reception module (821). Also, the processor (823) may be configured to decide whether or not a network connection is permitted and to decide a network connection target, based upon the information on the network connection. Herein, the network connection target may correspond to a frequency or cell respective to the base station (810) providing the first service or may correspond to a frequency or cell respective to another base station. Also, when a network connection is permitted, the processor (823) may be configured so as to transmit a network connection request message to the network connection target through the transmission module (822).

Additionally, the processor (823) of the user equipment device (820) may also perform functions of processing calculation (or operation) of information received by the user equipment device (820), information that is to be transmitted to the outside, and so on. And, the processor (823) of the user equipment device (820) may also be replaced by an element, such as a buffer (not shown).

In the detailed configurations of the above-described base station device and the user equipment device, the details that are described above according to the diverse embodiments of the present invention may be independently applied or 2 or more embodiments may also be applied in combination. Herein, for clarity, description on the identical parts (or features) will be omitted.

Furthermore, in the description of FIG. 8, the description of the base station device (810) may be identically applied to another type of entity providing the MBMS service. And, the description of the user equipment device (820) may also be identically applied to another type of entity receiving the MBMS service.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable not only to the MBMS but also to a variety of mobile communication systems supporting other similar services. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of a user equipment for performing network connection in a wireless communication system, the method comprising:
   receiving, at the user equipment from a first base station providing a first type service, information on a network connection for a second type service, wherein the information on the network connection includes a cause field value permitted for the network connection request to the first base station;
   determining whether or not the network connection is permitted and determining a target of the network connection, based upon the information on the network connection; and
   transmitting a network connection request message to the target of the network connection, if the network connection is permitted when a cause field value of the network connection request message is identical to the cause field value permitted for the network connection request to the first base station.

2. The method of claim 1, wherein the information on the network connection further includes at least one of information indicating whether or not a network connection to the first base station is permitted, or information indicating whether or not the network connection target is the first base station.

3. The method of claim 1, wherein the target of the network connection is selected among a plurality of base stations selectable by the user equipment based upon an assumption that the first base station has the lowest priority level, or wherein the target of the network connection is selected among remaining base stations excluding the first base station from the plurality of base stations.

4. The method of claim 1, wherein the information on the network connection further includes information directly indicating the target of the network connection.

5. The method of claim 1, wherein the information on the network connection further includes information on a class of the user equipment permitted to establish network connection to the first base station.

6. The method of claim 1, wherein the information on the network connection further includes information on a wait time, during which transmission of the network request message is not permitted, and wherein the step of transmitting the network connection request message is performed after the wait time is expired.

7. The method of claim 1, wherein, when the user equipment is not receiving the first type service from the first base station, or when the first type service has a lower priority level than the second type service for the user equipment, the first base station is determined as the target of the network connection, and wherein, when the user equipment is receiving the first type service from the first base station, or when the first type service has a higher priority level than the second type service for the user equipment, the second base station is determined as the target of the network connection.

8. The method of claim 1, wherein the information on the network connection is received from the first base station through a paging message, RRC (Radio Resource Control) signaling, or a system information block from the first base station.

9. The method of claim 1, wherein the target of the network connection is identified by at least one of a frequency or a cell.

10. The method of claim 1, wherein the first type service is an MBMS (Multimedia Broadcast/Multicast Service), and wherein the second type service is a dedicated service.

11. A user equipment performing network connection in a wireless communication system, the user equipment comprising:

a reception module for receiving a downlink signal;

a transmission module for transmitting an uplink signal; and a processor controlling the user equipment including the reception module and the transmission module, wherein the processor is configured to:

receive, from a first base station providing a first type service, information on a network connection for a second type service via the reception module, wherein the information on the network connection includes a cause field value permitted for the network connection request to the first base station;

determine whether or not the network connection is permitted and determine a target of the network connection, based upon the information on the network connection; and transmit, via the transmission module, a network connection request message to the target of the network connection, if the network connection is permitted when a cause field value of the network connection request message is identical to the cause field value permitted for the network connection request to the first base station.

* * * * *